United States Patent
Inoue et al.

(10) Patent No.: US 11,904,264 B2
(45) Date of Patent: Feb. 20, 2024

(54) METHOD FOR PRODUCING HONEYCOMB STRUCTURE

(71) Applicant: NGK INSULATORS, LTD., Nagoya (JP)

(72) Inventors: Jun Inoue, Nagoya (JP); Yutaka Ishii, Nagoya (JP); Toshiharu Tsutsumi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 872 days.

(21) Appl. No.: 16/812,682

(22) Filed: Mar. 9, 2020

(65) Prior Publication Data
US 2020/0298155 A1 Sep. 24, 2020

(30) Foreign Application Priority Data
Mar. 18, 2019 (JP) .................... 2019-050469

(51) Int. Cl.
*B01D 46/00* (2022.01)
*B05C 5/02* (2006.01)
(Continued)

(52) U.S. Cl.
CPC ..... *B01D 46/0001* (2013.01); *B01D 46/2478* (2021.08); *B28B 11/006* (2013.01); *C04B 37/00* (2013.01); *C04B 37/003* (2013.01)

(58) Field of Classification Search
None
See application file for complete search history.

(56) References Cited

U.S. PATENT DOCUMENTS

| 4,106,437 A * | 8/1978 | Bartlett | B05C 5/0254 |
| | | | 118/412 |
| 2004/0139913 A1* | 7/2004 | Kuromiya | B29C 48/31 |
| | | | 118/668 |

(Continued)

FOREIGN PATENT DOCUMENTS

| CN | 105921360 A * | 9/2016 | ........... B05C 5/0254 |
| CN | 105921360 A | 9/2016 | |

(Continued)

OTHER PUBLICATIONS

Flow Rate and Its Relation to Velocity • Physics. web.archive.org/web/20170530010957/https://philschatz.com/physics-book/contents/m42205.html. (Year: 2017).*

(Continued)

*Primary Examiner* — Alison L Hindenlang
*Assistant Examiner* — Andrés E. Behrens, Jr.
(74) *Attorney, Agent, or Firm* — BURR PATENT LAW, PLLC (57) ABSTRACT

A method for producing a honeycomb structure for fine particle collection filters, the honeycomb structure including a plurality of porous honeycomb structure segments. The method includes joining each of the porous honeycomb segments via a joining material layers by applying a joining material between joining surfaces of each of the porous honeycomb structure segments, through a nozzle portion of a joining material applicator. The nozzle portion of the joining material applicator includes: a joining material introduction port; a joining material discharge space; and a joining material flow path having a bent portion, through which the joining material passes from the joining material introduction port to the joining material discharge space. The joining material flow path of the nozzle portion includes a buffer space configured such that a flow path cross section (Continued)

gradually expands toward the joining material discharge space on a downstream side of the bent portion.

8 Claims, 11 Drawing Sheets

(51) Int. Cl.
    *B28B 11/00*     (2006.01)
    *C04B 37/00*     (2006.01)
    *B01D 46/24*     (2006.01)

(56) References Cited

U.S. PATENT DOCUMENTS

| | | | |
|---|---|---|---|
| 2006/0254713 A1 | | 11/2006 | Fujita et al. |
| 2014/0242283 A1 | * | 8/2014 | Joos ........................ B29C 48/31 |
| | | | 222/565 |

FOREIGN PATENT DOCUMENTS

| | | | | |
|---|---|---|---|---|
| CN | 206936306 U | | 1/2018 | |
| JP | 2004-262670 A1 | | 9/2004 | |
| JP | 2006263590 | * | 3/2005 | ............... B05C 5/02 |
| KR | 102106443 B1 | * | 3/2014 | ........... B05C 5/0225 |
| WO | WO-2016085779 A2 | * | 6/2016 | ............. B28B 1/002 |

OTHER PUBLICATIONS

CN-105921360-A (Song) Sep. 2016 (online machine translation), [Retrieved on Nov. 14, 2022]. Retrieved from: Espacenet (Year: 2016).*

KR-102106443B1 (Hwang) Mar. 2014 (online machine translation), [Retrieved on Nov. 14, 2022]. Retrieved from: Espacenet (Year: 2014).*

JP-2006263590 (Miyazawa) Mar. 2005 (online machine translation), [Retrieved on May 1, 2023]. Retrieved from: Espacenet (Year: 2005).*

Chinese Office Action (Application No. 202010165633.3) dated Jun. 22, 2021 (with English translation).

* cited by examiner

METHOD FOR PRODUCING HONEYCOMB STRUCTURE

FIELD OF THE INVENTION

The present invention relates to a method for producing a honeycomb structure. More particularly, it relates to a method for producing a honeycomb structure, which can improve a production efficiency of the honeycomb structure by suppressing application unevenness generated when applying a joining material to surfaces of honeycomb segments and preventing the joining material from dripping from a joining material discharging port of a nozzle portion of a joining material applicator.

BACKGROUND OF THE INVENTION

Conventionally, an internal combustion engine incorporates a diesel particulate filter (DPF) to collect fine particles contained in an exhaust gas from a diesel engine. Further, the internal combustion engine may incorporate a gasoline particulate filter (GPF) to collect fine particles contained in an exhaust gas from a gasoline engine. The DPF and GPF are formed by joining a plurality of porous honeycomb segments such as silicon carbide (SiC) through a joining material, and have a structure obtained by grinding an outer periphery of a segment joined body having the joined honeycomb segments to form a honeycomb structure having an appropriate shape such as a circle and an ellipse, and then coating the outer peripheral surface with a coating material.

Figure 1:
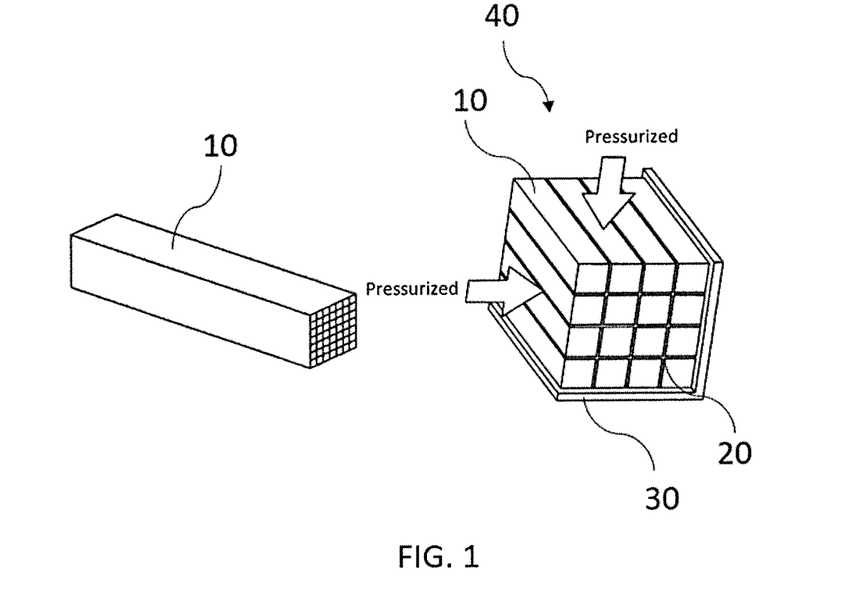
FIG. 1 is a schematic view showing a conventional honeycomb segment and a manner of producing a segment joined body by joining the honeycomb segments.
Figure 2:
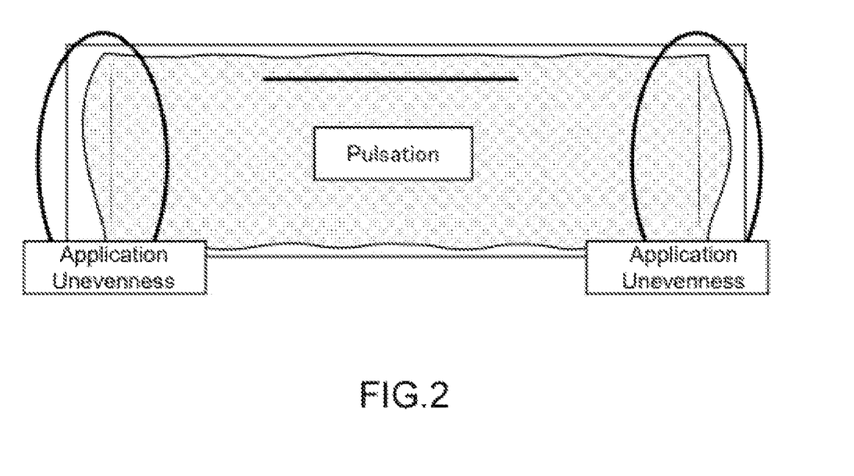
FIG. 2 shows an application unevenness and pulsation of a joining material in the conventional honeycomb segment.

Patent Document 1 discloses a method for producing a honeycomb structure by joining a plurality of porous honeycomb segments through a joining material to produce a segment joined body. In the method for producing the honeycomb structure as described in Patent Literature 1, as shown in FIG. 1, a plurality of porous honeycomb segments 10 are stacked along an L-shaped receiving plate 30 via adhesive layers 20 to obtain a desirable stacked structure, and then applying a pressure onto the entire structure. This leads to production of a segment joined body (honeycomb structure 40) in which the porous honeycomb segments 10 are vertically and horizontally stacked.

CITATION LIST

Patent Literature

Patent Literature 1: Japanese Patent Application Publication No. 2004-262670 A

SUMMARY OF THE INVENTION

In the production of the joined body of the porous honeycomb segments 10 as shown in FIG. 1, the joining material is generally applied between adjacent porous honeycomb segments 10 from the nozzle portion of the joining material applicator to form the adhesive layers 20. However, due to recent regulations, replacement of a refractory ceramic fiber (RCF)-free joining material changes properties of the conventional joining material, which cases a problem that the joining material cannot be uniformly applied. In particular, when a joining material having a higher thixotropic property is applied, responsiveness of the joining material is poor, for example, the joining material does not immediately respond to stress, so that application unevenness of the joining material will tend to occur.

Specifically, when the joining material is applied to the surfaces of the porous honeycomb segments through the nozzle portion of the joining material applicator, the application unevenness may occur at an application starting point and an application end point for the joining material as shown in FIG. 1. Further, the application unevenness may occur between the application starting point and the application end point due to pulsation of the joining material.

Figure 3:
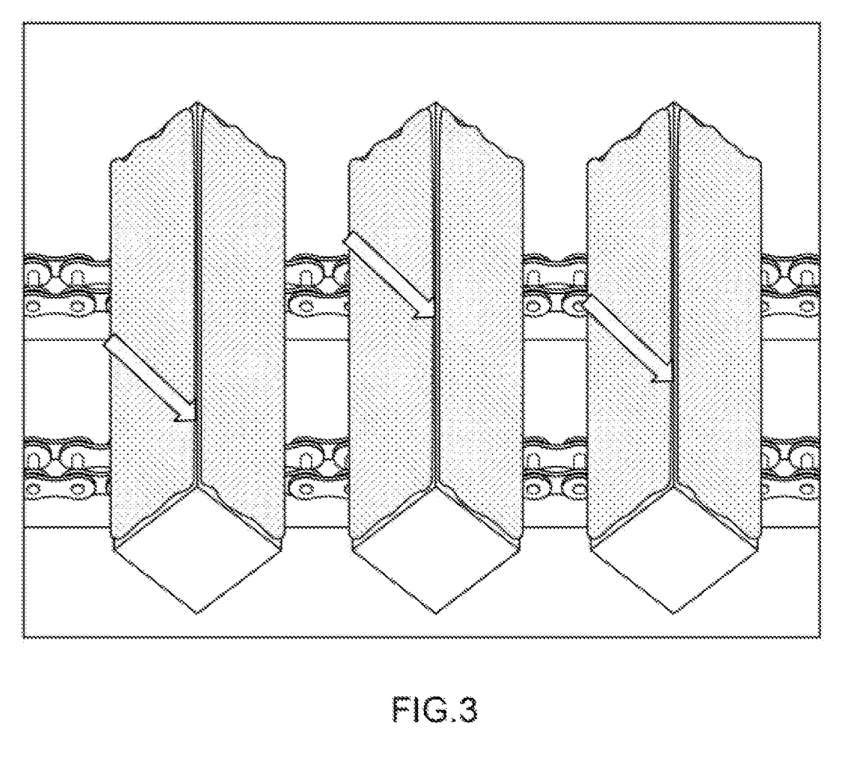
FIG. 3 shows an a variation in an application width of a joining material in the conventional honeycomb segment.
Figure 4:
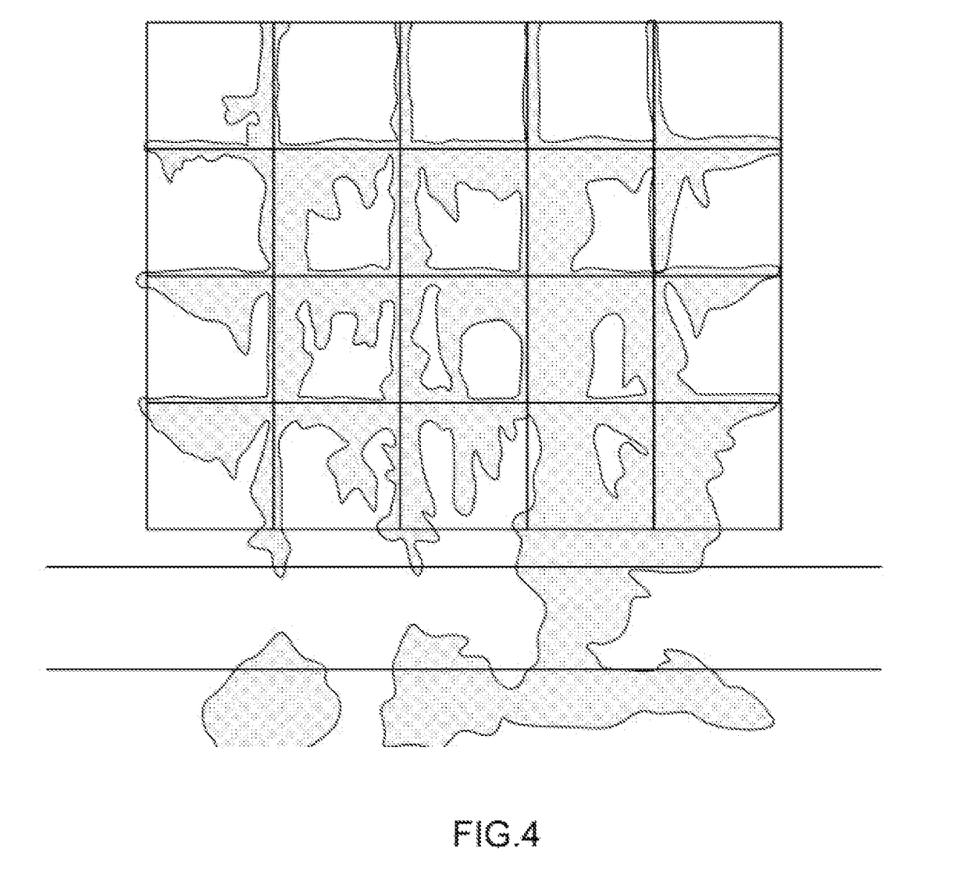
FIG. 4 shows an extrusions of a joining material in the conventional segment joined body.

Further, as shown in FIG. 3, an application width of the joining material may be non-uniform. If an application amount is increased in order to solve the non-uniformity, it will cause a problem that when the honeycomb segments are joined as shown in FIG. 4, an excessive amount of the joining material protrudes to decrease an efficiency for using the joining material.

Figure 5:
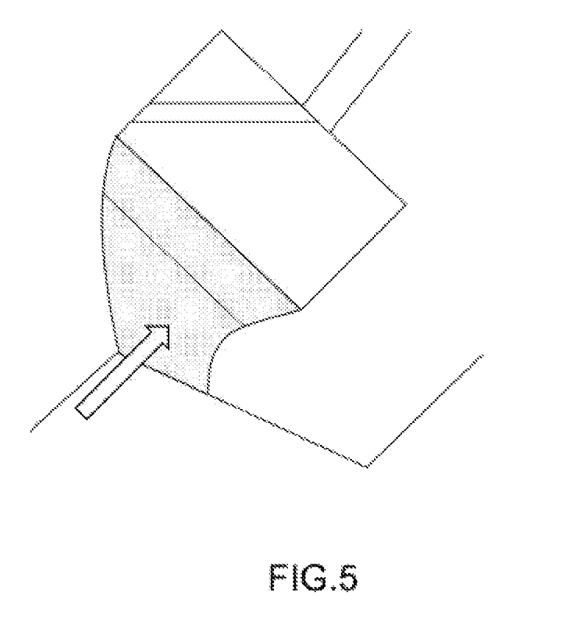
FIG. 5 shows an dripping of a joining material from a joining material discharge port of a nozzle portion of a conventional joining material applicator.

Further, when the joining material is applied through the nozzle portion of the joining material applicator, the joining material is not smoothly applied through the nozzle portion, and an increased amount of the joining material may be dripped from the joining material discharging port of the nozzle portion as shown in FIG. 5. An increased amount of the joining material dripped causes a problem of frequent cleaning of the nozzle portion.

All of the problems as described above cause deterioration of production efficiency of the honeycomb structure. In view of such circumstances, an object of the present invention is to suppresses application unevenness when applying the joining material onto the surfaces of the honeycomb segments and prevent the joining material from dripping from the joining material discharge port of the nozzle portion of the joining material applicator, thereby improving the production efficiency of the honeycomb structure.

As a result of intensive studies, the present inventors have presumed that the application unevenness when applying the joining material and the dripping of the joining material from the joining material discharge port of the nozzle portion of the joining material applicator are caused by a pressure of the joining material, generated inside the nozzle portion of the joining material applicator. Then, the present inventors have found that these problems can be solved by having a certain structure of the nozzle portion of the joining material applicator. Thus, the present invention is specified as follows:

A method for producing a honeycomb structure for fine particle collection filters, the honeycomb structure comprising a plurality of porous honeycomb structure segments joined together via joining material layers, each of the porous honeycomb structure segment comprising: partition walls made of a SiC material, the partition walls defining a plurality of cells to form flow paths for a fluid, each of the cells extending from an inflow end face that is an end face on a fluid inflow side to a fluid outflow end face that is an end face on a fluid inflow side; and an outer peripheral wall located at the outermost periphery, the method comprising:

joining each of the porous honeycomb segments via the joining material layers by applying a joining material between joining surfaces of each of the porous honeycomb structure segments, through a nozzle portion of a joining material applicator, wherein the nozzle portion of the joining material applicator comprises:

a joining material introduction port;

a joining material discharge space having a slit-shaped joining material discharge port for discharging an introduced joining material; and a joining material flow path having a bent portion, through which the joining material passes from the joining material introduction port to the joining material discharge space; and wherein the joining material flow path of the nozzle portion comprises a buffer space configured such that a flow path cross section gradually expands toward the joining material discharge space on a downstream side of the bent portion.

According to the present invention, it is possible to suppresses application unevenness when applying the joining material onto the surfaces of the honeycomb segments and prevent the joining material from dripping from the joining material discharge port of the nozzle portion of the joining material applicator, thereby improving the production efficiency of the honeycomb structure.

DETAILED DESCRIPTION OF THE INVENTION

Hereinafter, embodiments of a honeycomb structure according to the present invention will be specifically described with reference to the drawings. It is to understand that the present invention is not limited to the following embodiments, and various design modifications and improvements may be made based on ordinary knowledge of a person skilled in the art, without departing from the scope of the present invention.

(Method for Producing Honeycomb Structure)

Figure 6:
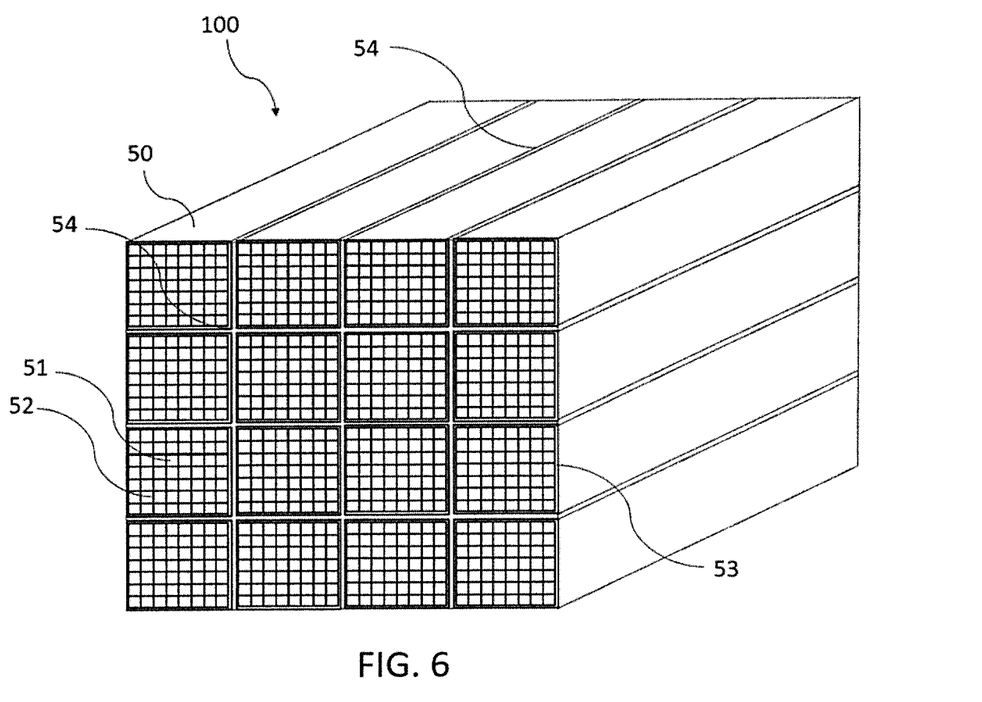
FIG. 6 is a schematic external view of a honeycomb structure according to an embodiment of the present invention.

FIG. 6 is a schematic external view of a honeycomb structure 100 produced by a method for producing a honeycomb structure according to an embodiment of the present invention. The honeycomb structure 100 is formed by binding a plurality of porous honeycomb structure segments 50 together via joining material layers 54, in which each porous honeycomb structure segment 50 includes: partition walls 52 made of a SiC material, which define a plurality of cells 51 to form flow paths for a fluid, and which extend from an inflow end face that is an end face on a fluid inflow side to an outflow end face that is an end face on a fluid outflow side; and an outer peripheral wall 53 located at the outermost periphery. Here, the SiC material means a material mainly based on SiC (silicon carbide), including, for example, a material consisting only of SiC such as recrystallized SiC, Si—SiC based composite materials, cordierite-SiC based composite materials, metal silicon-impregnated SiC, and the like.

The honeycomb structure 100 is formed by grinding the outer periphery into an appropriate shape such as a circular shape and an elliptical shape, and then coating the outer peripheral surface with a coating material, and is used as a fine particle collection filter such as a diesel engine particulate filter (DPF) and a gasoline particulate filter (GPF). The inflow end face or the outflow end face of the cells 51 serving as the flow paths for the fluid in the honeycomb structure 100 are provided with plugged portions, whereby fine particles (such as carbon fine particles) in an exhaust gas can be collected. Although the plugged portions may be provided at any time, but it is more preferable to provide the plugged portions before firing the porous honeycomb segments 50, because the plugged portions and the partition walls 52 are sintered by the firing.

For the honeycomb structure 100, a catalyst may be further provided on surfaces or inner side of the partition walls 52 made of a SiC material that define the plurality of cells 51. A type of the catalyst is not particularly limited, and it can be appropriately selected according to the use purpose and application of the honeycomb structure 100. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a lean nitrogen oxides trap catalyst (LNT catalyst) containing an alkaline earth metal and platinum as storage components for nitrogen oxides ($NO_x$). Illustrative examples of a catalyst that does not use the noble metal include a NOx selective catalytic reduction catalyst (SCR catalyst) containing a copper-substituted or iron-substituted zeolite, and the like. Further, two or more catalysts selected from the group consisting of those catalysts may be used. A method for supporting the catalyst is not particularly limited, and it can be carried out according to a conventional method for supporting the catalyst on the honeycomb structure 100.

Figure 7:
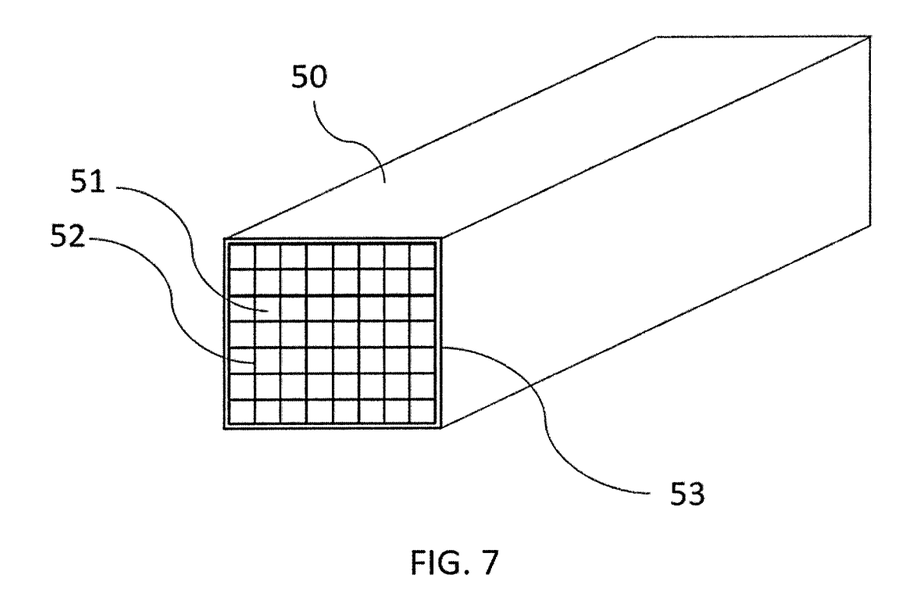
FIG. 7 is a schematic external view of a porous honeycomb segment according to an embodiment of the present invention.

In the method for producing the honeycomb structure according to an embodiment of the present invention, first, porous honeycomb segments 50 as illustrated in FIG. 7 are produced. As the production step of the porous honeycomb segments 50, first, a binder, a dispersant (surfactant), a pore former, water, and the like are added to a ceramic raw material made of a SiC material, and these are mixed and kneaded to prepare a green body. The prepared green body is then formed into a honeycomb shape by an extrusion molding method to obtain a raw (unfired) pillar shaped honeycomb formed body. The pillar shaped honeycomb formed body extruded from an extruder is cut into an appropriate length. The extrusion molding method can be carried out using an apparatus such as a ram type extruder, a bi-axial screw type continuous extruder or the like. For forming the honeycomb shape, a method using a die having a desired cell shape, partition wall thickness, and cell density is preferable. Thus, an unfired honeycomb formed body is produced.

An outer shape of the unfired pillar shaped honeycomb structure is not particularly limited, and it may be a pillar shape with rectangular end faces as in the present embodiment, or a pillar shape with circular end faces (circular pillar shape), or a pillar shape with polygonal (triangular, pentagonal, hexagonal, heptagonal, octagonal, etc.) end faces, except for rectangular end faces.

The unfired honeycomb formed body is then dried to produce a honeycomb dried body. The drying may be carried out by dielectric drying using high-frequency energy generated by passing a current through the porous honeycomb segments 50, or may be carried out by hot air drying which introduces hot air into the porous honeycomb segments 50. Further, natural drying left at room temperature, microwave drying using a microwave, freeze drying, or the like may be carried out, or a combination of a plurality of drying methods may be carried out. Subsequently, the honeycomb dried body is fired. In this case, the plugged portions are provided by sintering a plugging material on both end faces of the honeycomb dried body so as to form segments, in order to purify fine particles (carbon fine particles and the like) in an exhaust gas. The plugged portions are formed in each cell on both end faces. When a cell is plugged on one end face, its opposite end face is not plugged. Such plugging can provide a filter function. Thus, the porous honeycomb segments 50 are produced.

The joining material is applied to each of the plurality of porous honeycomb segments 50 between the joining surfaces using the joining material applicator to join them via the joining material layers 54. In the joining step, a plurality of porous honeycomb segments 50 may be stacked along an L-shaped receiving plate via the joining material layers 54 using the method shown in FIG. 1 to form a desired stacked structure, and then applying a pressure to the entire structure to join them. Thus, the honeycomb structure 100 as shown in FIG. 6 is produced.

The joining material forming the joining material layers 54 is not particularly limited as long as it can join the surfaces of the outer peripheral walls 53 made of the SiC material to each other with good adhesive strength. The joining material forming the joining material layers 54 may contain, for example, inorganic particles, and inorganic fibers and colloidal oxides as other components. Further, during the joining of the porous honeycomb segments 50, in addition to those components, an organic binder such as methylcellulose and carboxymethylcellulose, a dispersant, water and the like may be optionally added, and mixed and kneaded using a kneader such as a mixer to form a paste, which may be used as a joining material.

Examples of materials for forming the inorganic particles contained in the joining material forming the joining material layers 54 includes ceramics selected from the group consisting of silicon carbide, silicon nitride, cordierite, alumina, mullite, zirconia, zirconium phosphate, aluminum titanate, titania, and combinations thereof; Fe—Cr—Al-based metals; nickel-based metals; silicon-silicon carbide-based composite materials; and the like.

Examples of the inorganic fibers contained in the joining material forming the joining material layers 54 include ceramic fibers such as aluminosilicate and silicon carbide, and metal fibers such as copper and iron. Suitable colloidal oxides include silica sol, alumina sol and the like. The colloidal oxides are suitable for providing a suitable adhesive force to the joining material, and can also be bonded to the inorganic fibers and the inorganic particles by drying and degreasing them to provide a strong joining material having improved heat resistance after drying.

In the method for producing the honeycomb structure according to an embodiment of the present invention, when the joining material is applied to each of the plurality of porous honeycomb segments 50 between the joining surfaces, a nozzle portion of the joining material applicator, which has the following structure, is used. This can suppress application unevenness during application of the joining material to the surfaces of the honeycomb segments and prevent the joining material from dripping from a joining material discharge port of the nozzle portion of the joining material applicator. As a result, a production efficiency of the honeycomb structure can be improved.

(Structure of Nozzle Portion of Joining Material Applicator)

Figure 8:
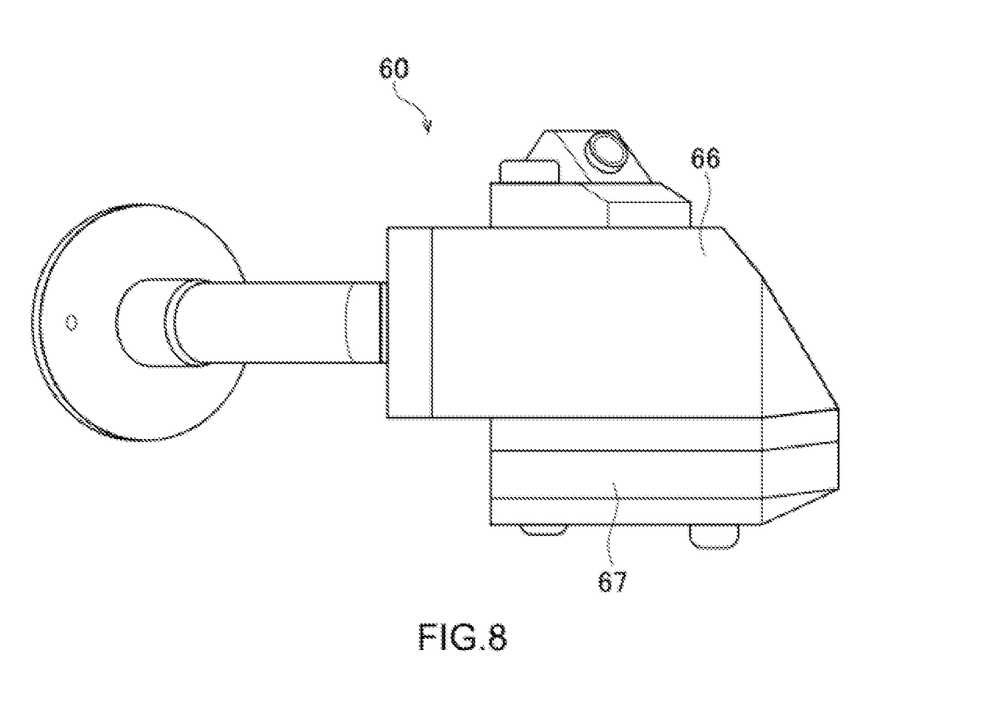
FIG. 8 shows a nozzle portion 60 of a joining material applicator according to an embodiment of the present invention.
Figure 9:
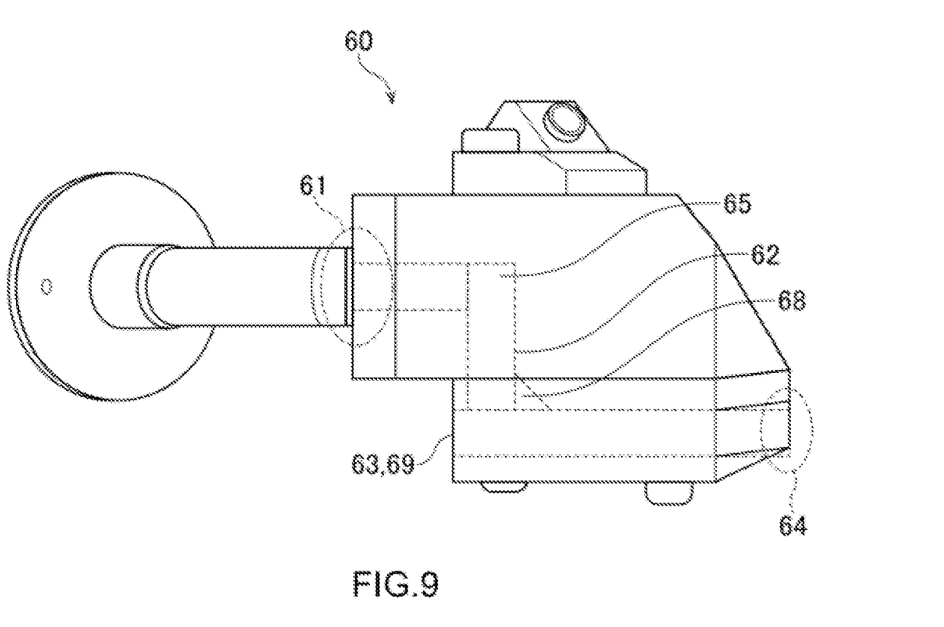
FIG. 9 shows an internal structure of the nozzle portion 60 of the joining material applicator according to an embodiment of the present invention.

FIG. 8 show a nozzle portion 60 of the joining material applicator according to an embodiment of the present invention. FIG. 9 shows an internal structure of the nozzle portion 60 of the joining material applicator according to an embodiment of the present invention.

The nozzle portion 60 of the joining material applicator includes a nozzle portion main body 66 and a spacer 67. The nozzle portion main body 66 includes: joining material introduction port 61 into which the joining material prepared in the joining material applicator is introduced; a joining material discharge space 63 having a slit-shaped joining material discharge port 64 for discharging the introduced joining material; and a joining material flow path 62 having a bent portion 65, through which the joining material passes from the joining material introduction port 61 to the joining material discharge space 63. The spacer 67 is inserted into the joining material discharge space 63 of the nozzle portion main body 66.

The nozzle portion main body 66 may be formed of any material known for a joining material applying nozzle. The nozzle portion main body 66 can be formed of, for example, aluminum, iron, copper, or an alloy such as SUS, or a resin such as polyethylene, vinyl chloride, fluororesin and polycarbonate.

A cross section of the flow path for the joining material in the joining material introduction port 61 and the joining material flow path 62 may have any shape, including, for example, a circular shape, an elliptical shape, or a polygonal shape. A size of the cross section of the flow path for the joining material can be appropriately designed according to the size of the nozzle portion 60 and the like, and for example, the cross section can be formed in a circular shape having a diameter of from 5.0 to 20.0 mm.

The joining material flow path 62 has the bent portion 65. FIG. 9 illustrates a structure in which the joining material flow path 62 connected to the joining material introduction port 61 straightly extends as it is, bends at approximately 90° at the bent portion 65, and extends to the joining material discharge space 63 on the downstream side of the bent portion 65. The joining material flow path 62 is not limited to that is bent at approximately 90° at the bent portion 65 as described above, and it may be bent at any angle. The joining material introduced from the joining material introduction port 61 into the joining material flow path 62 is thinly stretched in the joining material discharge space 63 by passing through the bent portion 65, and is discharged through the joining material discharge port 64. The bent portion 65 can prevent a difference in flow velocity between both ends and the center of the slit-shaped joining material discharge port 64 when the joining material is thinly stretched by the joining material discharge space 63.

Figure 10:
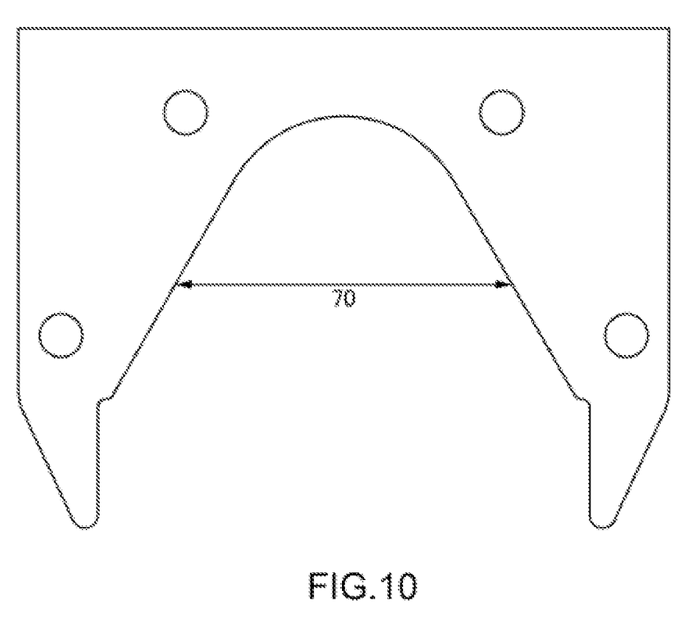
FIG. 10 shows a flat-shaped spacer that partitions a joining material discharge space of a nozzle portion main body according to an embodiment of the present invention.

A size of the slit-shaped joining material discharge port 64 of the joining material discharge space 63 can be appropriately designed according to the size of the nozzle portion 60, an application width and an application amount of the joining material. For example, the slit-shaped joining material discharge port 64 can be formed into a rectangular shape having a length of from 40 to 60 mm and a width of from 25 to 45 mm. The joining material discharge space 63 can be formed by inserting a flat-shaped spacer as shown in FIG. 10 into the joining material discharge space 63 of the nozzle portion main body 66 to partition it. In the joining material discharge space 63 partitioned by the flat-shaped spacer shown in FIG. 10, a space width 70 is increased toward the joining material discharge port 64. Accordingly, the joining material discharge space 63 can be formed so as to expand the flow path cross section of the joining material from introduction of the joining material from the joining material flow path 62 to discharge through the joining material discharge port 64. This structure can prevent a difference in flow velocity between both ends and the center of the slit-shaped joining material discharge port 64.

The joining material flow path 62 includes a buffer space 68 which is adjacent to the joining material discharge space 63 on the downstream side of the bent portion 65 and which is configured such that the flow path cross section gradually expands toward the joining material discharge space 63. The joining material that has passed through the joining material flow path 62 is introduced into the joining material discharge space 63 as described above, and then discharged through the slit-shaped joining material discharge port 64 of the joining material discharge space 63. In this case, a constant size of the flow path cross section of the joining material flow path 6 increases a pressure inside the nozzle portion 60, for example when the joining material has high thixotropy and poor response. In contrast, according to the embodiment of the present invention, the buffer space 68 of the joining material flow path 62 is provided, thereby expanding the flow path cross section of the joining material prior to introduction into the joining material discharge space 63, so that an increase in a pressure inside the nozzle portion 60 can be suppressed. Therefore, the application unevenness can be satisfactorily suppressed for example when applying the joining material to the surfaces of the porous honeycomb segments through the nozzle portion 60 of the joining material applicator. Further, since the joining material can be smoothly discharged through the slit-shaped joining material discharge port 64 of the joining material discharge space 63, the application width of the joining material becomes uniform, so that the dripping of the joining material from the joining material discharge port 64 of the nozzle portion 60 can also be satisfactorily suppressed.

The buffer space 68 can be formed by partitioning with the flat-shaped spacer. The flat-shaped spacer may be an integral spacer formed so that the cross section of the flow path gradually expands.

Figure 11A:
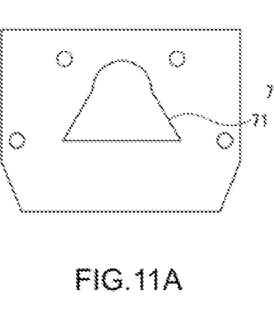
FIGS. 11A, 11B and 11C are flat-shaped spacers that partitions a buffer space according to an embodiment of the present invention.
Figure 11B:
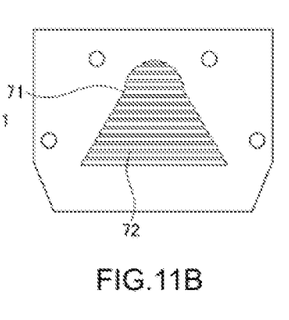
Figure 11C:
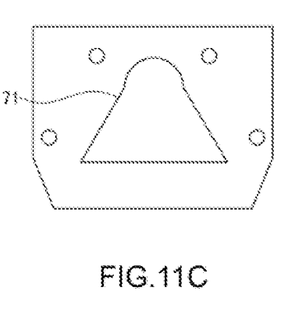

The nozzle portion 60 of the joining material applicator according to an embodiment of the present invention further includes, as the buffer space, a buffer space 69 configured to extend from the buffer space 68 into the joining material discharge space 63, in addition to the buffer space 68. The buffer spaces 68 and 69 can be formed such that a plurality of flat-shaped spacers as shown in FIGS. 11A, 11B and 11C are stacked in order from the joining material flow path 62 side, and finally inserting the flat-shaped spacer as shown in FIG. 10. In the spacers of FIGS. 11A, 11B and 11C, an area of an opening 71 corresponding to the flow path cross section gradually increases in that order. Therefore, the spacer of FIG. 11A which is adjacent to the joining material discharge space 63 and has the smallest area of the opening 71 is provided, the spacer of FIG. 11B is then provided and the spacer of FIG. 11C having the largest area of the opening 71 is further provided in the joining material discharge spaced, thereby forming a buffer structure in which the flow path of the joining material is gradually expanded. According to such a structure, the flow path of the joining material can be expanded until it is narrowed by the joining material discharge port 64, so that retention of the joining material in the nozzle portion 60 can be satisfactorily suppressed. Further, by such a structure, the buffer space 69 of the joining material discharge space 63 can be expanded by 200 to 550%.

Thicknesses of the flat-shaped spacers as shown in FIGS. 11A, 11B and 11C are not particularly limited, and they may be, for example, from 1.0 to 10 mm, respectively. Further, the thicknesses of the plurality of spacers may be the same or different.

At least one of the plurality of flat-shaped spacers may also serve as a strainer by having a structure including partition walls 72 that partition the opening 71 in the form of parallel slits as shown in FIG. 11B. Such a structure can allow foreign substances contained in the joining material to be collected, so that clogging of the nozzle portion 60 can be suppressed.

The material of the spacer that partitions the buffer space 68 is not particularly limited. For example, the spacer can be formed of aluminum, iron, copper, or an alloy such as SUS, or a resin such as polyethylene, vinyl chloride, fluororesin, or polycarbonate.

EXAMPLES

Hereinafter, examples will be provided for better understanding of the present invention and its advantages, but the present invention is not limited to these examples.

Test Example 1

As Test Example 1, porous honeycomb segments made of a SiC material were prepared. The length of each porous honeycomb segment in the cell extending direction was 141 mm.

Separately, a joining material applicator having a nozzle portion made of a SUS material and a fluororesin plate having the structure as shown in FIGS. 8 and 9 was prepared. The buffer space of the joining material flow path of the nozzle portion was formed by stacking and partitioning the flat-shaped spacers shown in FIGS. 11A, 11B and 11C. That is, in the joining material discharge space 63, from the joining material flow path side, the spacer of FIG. 11A having the smallest area of the opening 71, the spacer of FIG. 11B, and the spacer of FIG. 11C having the largest area of the opening 71 were arranged in this order, and the flat-shaped spacer as shown in FIG. 10 was finally inserted. The thicknesses of the flat-shaped spacers shown in FIGS. 11A, 11B and 11C were 5 mm, 0.5 mm and 3 mm, respectively. The spacers of FIGS. 11A and 11C were made of fluororesin, and the spacer of FIG. 11B was made of SUS304. The thickness of the flat-shaped spacer shown in FIG. 10 was 1 mm, and the material was fluororesin.

The joining material contained inorganic fibers, and used a slurry mainly based on silicon carbide as ceramic powder, water as a dispersion medium, and colloidal silica as a binder. A shear stress value indicating viscosity of the joining material was 240 Pa.

The joining material was applied at a constant rate (100 mm/s) from one end of the joining surface to the other end of each porous honeycomb segment along the extending direction of the cells of the porous honeycomb segment through the nozzle portion. The application width was 37.0 cm.

After the application, the applied surfaces of the joining material in the porous honeycomb segments were observed, indicating that no application unevenness was found. Further, the dripping of the joining material from the joining material discharge port of the nozzle portion of the joining material applicator was also satisfactorily suppressed.

DESCRIPTION OF REFERENCE NUMERALS 10,50 porous honeycomb segment
20 adhesive layer
30 receiving plate
40, 100 honeycomb structure
51 cell
52 partition wall
53 outer peripheral wall
54 joining material layer
60 nozzle portion
61 joining material introduction port
62 joining material flow path
63 joining material discharge space
64 joining material discharge port
65 bend portion
66 nozzle portion main body
67 spacer
68, 69 buffer space
70 space width
71 opening
72 partition wall

What is claimed is:

1. A method for producing a honeycomb structure for fine particle collection filters, the honeycomb structure comprising a plurality of porous honeycomb structure segments joined together via joining material layers, each of the porous honeycomb structure segment comprising: partition walls made of a SiC material, the partition walls defining a plurality of cells to form flow paths for a fluid, each of the cells extending from an inflow end face that is an end face on a fluid inflow side to a fluid outflow end face that is an end face on a fluid inflow side; and an outer peripheral wall located at the outermost periphery, the method comprising:

joining each of the porous honeycomb segments via the joining material layers by applying a joining material between joining surfaces of each of the porous honeycomb structure segments, through a nozzle portion of a joining material applicator, wherein the nozzle portion of the joining material applicator comprises:

a joining material introduction port;

a joining material discharge space having a slit-shaped joining material discharge port for discharging an introduced joining material; and a joining material flow path having a bent portion, through which the joining material passes from the joining material introduction port to the joining material discharge space; and wherein the joining material flow path of the nozzle portion comprises a buffer space configured such that a flow path cross section gradually expands toward the joining material discharge space on a downstream side of the bent portion; and wherein the slit-shaped joining material discharge port has a length of 40 to 60 mm, and a width of from 25 to 45 mm.

2. The method for producing the honeycomb structure according to claim 1, wherein the buffer space is configured to extend into the joining material discharge space.

3. The method for producing the honeycomb structure according to claim 1, wherein the joining material discharge space is configured so as to expand a flow path cross section of the joining material from introduction of the joining material from the joining material flow path to discharge through the joining material discharge port.

4. The method for producing the honeycomb structure according to claim 1, wherein the joining material discharge space is formed by being partitioned with a flat-shaped spacer.

5. The method for producing the honeycomb structure according to claim 1, wherein the buffer space is formed by being partitioned with a flat-shaped spacer.

6. The method for producing the honeycomb structure according to claim 5, wherein the buffer space is formed by being partitioned with a plurality of the flat-shaped spacers stacked.

7. The method for producing the honeycomb structure according to claim 6, wherein a cross section of the flow path of the buffer space partitioned by the plurality of the flat-shaped spacers is increased as it approaches the joining material discharge space.

8. The method for producing the honeycomb structure according to claim 6, wherein at least one of the plurality of the flat-shaped spacers also serves as a strainer.

* * * * *